Patented Nov. 19, 1940

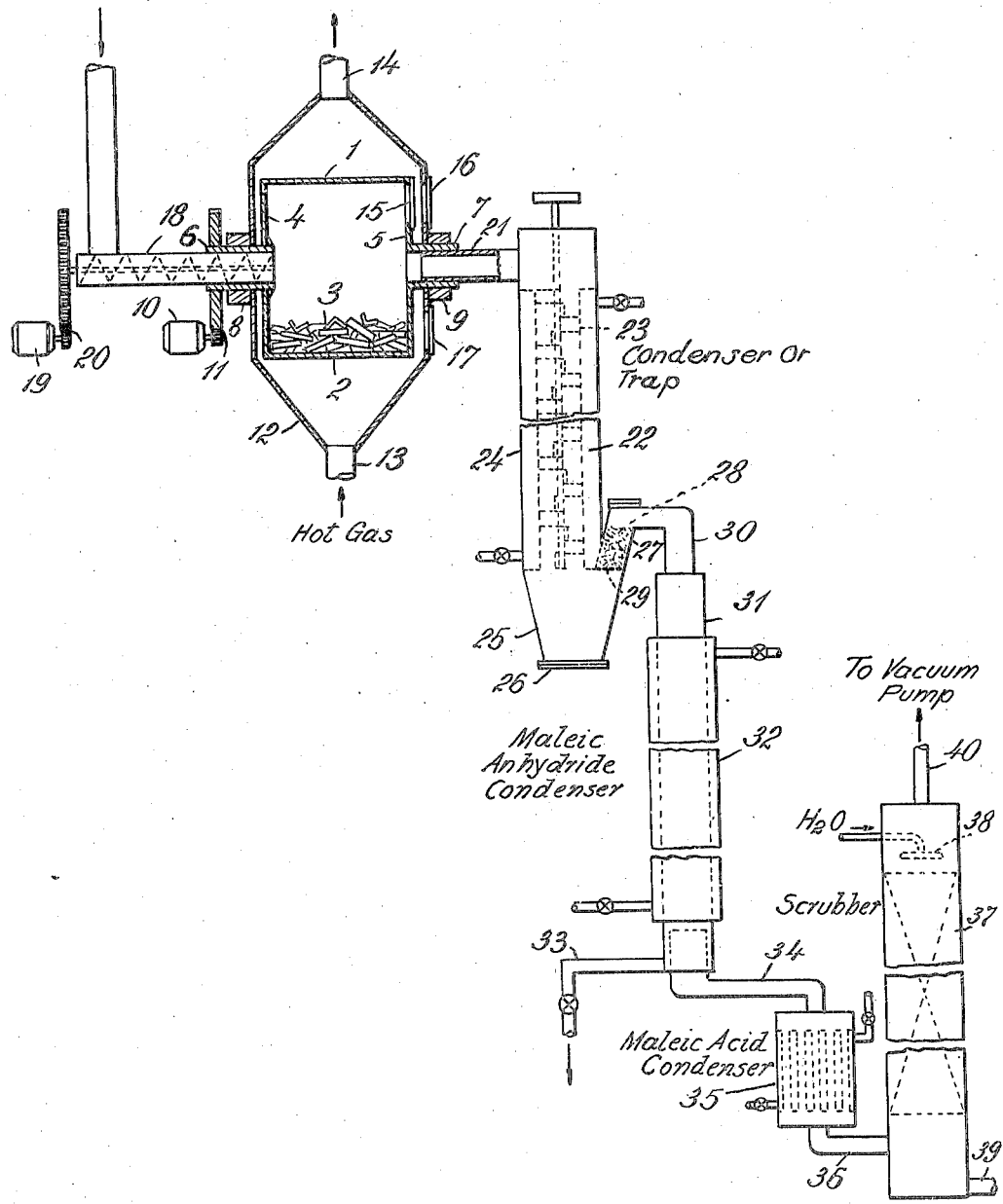

2,222,283

UNITED STATES PATENT OFFICE 2,222,283

MANUFACTURE OF MALEIC ANHYDRIDE

Joyce H. Crowell, Orchard Park, N. Y., assignor to National Aniline and Chemical Company, Inc., New York, N. Y., a corporation of New York Application December 13, 1938, Serial No. 245,370

4 Claims. (Cl. 260—343)

This invention relates to an improved process for the manufacture of maleic acid anhydride. More particularly it is directed to an improved method for thermally decomposing maleic acid by bringing the maleic acid into contact with a vaporizing surface maintained below the temperature at which maleic anhydride is thermally destroyed in substantial amounts, but sufficiently above the decomposition temperature of maleic acid to effect rapid decomposition thereof into maleic anhydride vapor and water vapor.

In U. S. Patent application Serial No. 120,381, filed January 13, 1937, jointly by the applicant herein and Harold B. Foster, there is described a process for the manufacture of maleic anhydride wherein maleic acid is subjected to total vaporization by contact with a heating medium maintained at a temperature well above the decomposition point of the acid so that the maleic acid is promptly decomposed and a vapor mixture comprising maleic anhydride and water vapor is formed.

This process comprises bringing maleic acid into contact with a vaporizing surface at a temperature above about 150° C. and preferably between 160° and 400° C. in such a manner that the maleic acid is flashed into a maleic anhydride vapor and water vapor mixture which in the process of formation is raised to a temperature that is preferably above 150° C. and especially between 160° C. and 400° C. The temperatures at which the maleic acid can be flashed satisfactorily into mixtures of maleic anhydride vapor and water vapor are reduced by effecting the vaporization of the acid at subatmospheric pressures. In a preferred process, maleic acid is flashed at an absolute pressure between about 100 mm. and about 250 mm. of mercury into a vapor mixture containing maleic anhydride and water vapor which reaches a temperature between 160° C. and 350° C. By this process it is possible to obtain high yields of maleic anhydride with the formation of neglible quantities of fumaric acid.

In the application of the foregoing process, it has been found that the vaporization and decomposition of the maleic acid, especially of technical grades of maleic acid, leave a residue of non-volatile products. This residue may comprise fumaric acid, metal particles resulting from abrasion of the metal scraping surfaces, inorganic impurities carried in by the maleic acid, and decomposition (e. g., carbonization) products of maleic acid and/or of other acids accompanying the maleic acid and/or of the salts which these acids may form with the metals of which the scrapers and decomposing chamber are made. When the process is carried out properly, the residue may amount to about 1 per cent or 2 per cent of the maleic acid undergoing decomposition into maleic anhydride; but it tends to adhere to the heated surfaces in the decomposing chamber, and if not removed promptly, it accumulates in insulating layers. These layers prevent direct, intimate contact of maleic acid with the heated surfaces, and retard the transfer of heat from the hot surfaces to the acid. This retardation of the transfer of heat to the maleic acid and consequently of the necessary rapid thermolytic decomposition of the acid, correspondingly increases the formation of the aforesaid residual byproducts, notably of fumaric acid, the presence of which aggravates the undesirable course of the decomposition, through building up further insulating layers of residue.

I have found that this residue is converted by heat into a friable solid. The process of the present invention takes advantage of this property of the residue to effect its removal from the hot surface and its elimination from the zone of reaction.

In accordance with the present invention the maleic acid to be dehydrated is introduced gradually, either continuously or intermittently, into an externally heated rotating vessel containing loose gravitational scraping elements, such as iron bars, angle irons, and the like, having sufficient mass to vigorously scour the walls of the vessel when the vessel is rotated.

The vessel, which may be of generally cylindrical or frusto-conical (designated generically in the claims as "circular") contour, the curved wall constituting the floor thereof, should be rotated substantially continuously during the dehydration of the maleic acid so as to present continually a fresh surface to the entering maleic acid and to cause the byproducts and/or residue to be removed as by scraping or chipping from the heated inner surfaces of the decomposition vessel and of the scraping elements therein before the said surfaces are again brought into contact with entering maleic acid.

Preferably the curved wall of the vessel is so disposed that if a vertical axial plane is passed therethrough, the lower intersection of the plane with the wall is a line disposed approximately horizontally.

I have found that by means of a rotating vessel and scraping elements of the type herein described, it is possible not only to decompose maleic acid rapidly into a maleic anhydride vapor and water vapor mixture, but also to effect this decomposition with so little formation of insulating layers of residue and undesirable decomposition byproducts, that the desired decomposition can be effected continuously, over long periods of time, which may extend into months, during which shut-downs for removal of residue from the vessel are unnecessary. The scraping elements remove friable residue from the hot surfaces of the decomposing vessel and also from their own surfaces, substantially as quickly as the said residue is formed, and grind it to a fine powder which is carried out of the vessel by entrainment in the stream of vapors, to a separator provided for separating the powdered residue from the vapors; they spread the entering maleic acid over the heated surface; and in the case where solid maleic acid is employed, they quickly crush oversized particles to a degree of fineness which permits the crushed materials to vaporize rapidly.

To attain efficient and continuous thermolytic decomposition of maleic acid into desired maleic anhydride and water vapors, the maleic acid is introduced into the decomposition vessel at a rate which is limited by the ability of the vessel to communicate its heat at the necessary rate to the acid. Thus, for example, it has been found that in a vessel which is provided with scrapers as hereinbefore described and which is rotated at a convenient speed, the thermolytic decomposition of maleic acid into vapors of maleic anhydride and water is easily and continuously effected by maintaining the vapor pressure within the decomposing vessel at about 150 mm. of mercury (absolute pressure) and introducing the maleic acid at a rate which causes the resulting mixture of vapors to leave the vessel at a temperature of about 150° C., or higher, while the vessel itself is heated by external means, as for example, by heated gases which impinge upon and/or flow around the rotating vessel and are at a sufficiently high temperature to supply the vessel with the necessary amount of heat. Under such conditions, it has been found that a small unavoidable amount of residue, which does not interfere with the process, remains in the vessel. (This amount of residue gradually forms when the reaction is started in a clean vessel, and remains substantially constant with proper operation of the process.)

With the conditions of operation outlined above the process of the present invention may be operated continuously for weeks to convert maleic acid into maleic anhydride vapor-water vapor mixtures to the extent of 98% to 99% of the maleic acid charged.

The decomposition or dehydration of maleic acid in accordance with the process of the present invention may be conducted at atmospheric pressure in which case the vapor temperature should be maintained in the neighborhood of 200° C. or higher; preferably however an absolute pressure below 250 mm. of mercury is employed.

The rate of rotation of the decomposition vessel is not critical but should be rapid enough to maintain the temperatures along the walls of the vessel fairly constant and to prevent building up of residue of substantial thickness. The minimum rate to accomplish these purposes will depend upon the efficiency of the scraping elements, the temperature of the heating fluid surrounding the vessel, the maleic acid feed rate, etc.

The decomposition may be accelerated by introducing a hot inert gas directly into the decomposition vessel if desired.

If the rate at which the vessel communicates the necessary amount of heat to the maleic acid is less than that required by the rate of introduction of maleic acid—which can happen if the heating gases are not maintained at a sufficiently elevated temperature, or if the maleic acid is charged too rapidly into the vessel—there occurs a decomposition of maleic acid into excessive amounts of fumaric acid, and other undesirable residues and byproducts, which exert an undue insulating effect and thereby cause an accumulation of these undesirable residues in the vessel at an increasing rate. Accumulation of excessive amounts of undesirable residue manifests itself by significant disturbances, such as a fall in the temperature of the vapors leaving the decomposition vessel, a rise in the temperature of the heating gases which leave the heating enclosure around the vessel, a deadening of the metallic scraping sound which is normally heard and is caused by the metal with metal contact of the moving scrapers and vessel, and a fall in the ratio of the rate of maleic anhydride recovery to the rate at which the maleic acid is introduced into the vessel. Again, the maleic acid may be charged at such a low rate that the amount of heat transferred to the charge is much greater than that required to flash it into a mixture of vapors at the required temperatures. Such a procedure causes undesirable thermal destruction of maleic acid and/or its anhydride, which is manifested by the empyreumatic odor and/or deepened color of the condensates of the vapors and by the falling off in ratio of the rate of recovery of maleic anhydride to the rate at which the maleic acid is introduced into the vessel. All of these signs, singly or in combinations, are distinctly symptomatic of a maladjustment of the rate of feed of maleic acid and/or of the temperature of the heating gases; and form effective and simple indicators and guides for readjustment of conditions to reestablish efficient and continuous operation.

The suitability and adaptability of the apparatus for maintaining contact surfaces substantially free from decomposition residue may be illustrated by the results obtained in a test of a small apparatus of the type described above. The said test apparatus was connected with necessary auxiliary units, namely, means for charging maleic acid at a determinable rate to the apparatus, means for heating the apparatus, and a succession of units comprising in the order named a unit for condensing fumaric acid from the vapors leaving the apparatus and for filtering entrained powdered residue therefrom; a condenser unit with condensate receiver for removing maleic anhydride from the filtered fumaric-free vapors; a water scrubber for condensing the remaining vapors, which consist essentially of water vapor and a small residual amount of maleic anhydride which is thus recovered as maleic acid; and a pump for evacuating the whole system of connected units to a desired subatmospheric pressure.

During a test of the aforementioned small apparatus, dry, brown maleic acid crystals, 10 to 20 mesh and containing about 98 per cent of their weight of maleic acid, were fed into the rotating decomposition vessel. At the end of a continuous run for thirty hours, during which 707 pounds maleic acid, at a rate of about 23½ pounds per hour, had been treated, the process was interrupted for an inspection of the apparatus. It was found that the scraped inner surface of the decomposing chamber and the surfaces of the scraping elements were substantially clean and the decomposing chamber had approximately one pound of solid non-acidic material therein; the filter and fumaric acid unit contained about 15 pounds of solids (of which 5 pounds were non-acidic); the maleic anhydride receiver contained about 542 pounds of maleic anhydride containing 98 per cent by weight of pure maleic anhydride and 2 per cent by weight of maleic acid; and the water scrubber contained about 43 pounds of maleic acid, making the total recovery of maleic anhydride and maleic acid equivalent to 683 pounds maleic acid or about 98 per cent of the maleic acid charged. The decomposition chamber was sufficiently clean to show that with a continuance of the established required operating conditions, it could have continued to function properly for a further indefinite period if the operation had not been interrupted for the inspection.

The self-cleaning ability of my type of decomposing chamber has been further demonstrated over much longer periods of operation. Thus in several months of operation with decomposition of more than a hundred thousand pounds of maleic acid, it was not necessary to interrupt the process to clean out decomposition residue, and the high efficiency of the heating surface was continuously maintained.

The following description of several specific embodiments of my invention, illustrated by the accompanying drawing, will serve further to clarify the nature and value of the process of my invention.

In the drawing there is shown diagrammatically a form of apparatus suitable for conducting the decomposition or dissociation of maleic acid according to the present invention and recovering the products thereof.

The numeral 1 designates a cylindrical drum disposed about a horizontal axis and having a contact or heating surface 2. Within the drum, loose scraping elements 3 are shown in the form of short sections of angle iron. The end walls 4 and 5 of the drum are provided with axial hollow trunnions 6 and 7, respectively, mounted in bearings 8 and 9.

The drum 1 may be constructed of any suitable material, such as cast iron, steel, nickel, Sudite, Monel metal, Allegheny metal, and various other steels containing chromium and other metals. The angle irons within the drum may be composed of similar material.

A motor 10 is arranged for rotating the drum through a suitable gear train 11. Surrounding the drum a casing 12, having a gas inlet 13 and an outlet 14, is provided for the passage of hot gases, such as hot combustion gases, for heating the drum. A cover plate 15 may be provided on wall 5 and access may be had to this cover plate through plates 16 and 17 respectively for loading and unloading the drum. A screw conveyer 18, driven by motor 19, through a suitable gear train 20, leads from a feed hopper (not shown) through trunnion 6 in wall 4 to the higher or narrower end of the drum and extends sufficiently within the drum to permit material conveyed through trunnion 6 to fall directly upon the floor 2 without contacting with wall 4.

The interior of the drum is connected by a conduit 21 leading through trunnion 7 to a dust trap or fumaric acid condenser 22 having a rotary scraping device 23 and a cooling jacket 24. This condenser advantageously may be of the type described and claimed in U. S. patent application, Serial No. 223,232, filed August 5, 1938, in the name of Carl L. Masters. At the bottom of this condenser is a hopper 25 having a closure 26, which may be removed for recovery of fumaric acid condensate and dust. If desired, provision may be made for continuous or intermittent removal of this material without shutting down the apparatus. A vapor outlet 27, filled with a suitable filtering medium, such as glass wool 28 supported on a screen 29, leads off from hopper 25 and is connected by conduit 30 with a maleic anhydride condenser 31 having a cooling jacket 32. A liquid draw-off pipe 33 is provided at the bottom of this condenser for removing molten maleic anhydride. For vacuum operation this draw-off pipe may be a barometric leg. Vapor outlet 34 leads from the condenser 31, optionally, to a final condenser 35 which is connected by conduit 36 with a scrubber 37 of any suitable design or directly to the scrubber. The scrubber is illustrated as a packed tower having a spray head 38 near the top, a liquid outlet 39 at the bottom, and a gas outlet 40 at the top—the last leading to a vacuum pump.

The above apparatus may be operated as follows:

In starting, after dry, solid maleic acid has been introduced into the feed hopper, the vacuum pump is started to exhaust the apparatus to an absolute pressure of 150 to 155 mm. of mercury, and hot combustion gas at a temperature around 375° C. to 400° C. is introduced through inlet 13 to casing 12 to heat the drum surface. The drum is rotated at about 48 to 50 R. P. M. and the screw conveyor 18 is set in operation to fed the maleic acid slowly into the heated drum at such a rate that the vapors leaving the drum will be at a temperature between 200° and 240° C. The hot vapors pass out through conduit 21 into condenser or trap 22, which, by means of a boiling liquid in jacket 24, may be maintained at a temperature of about 145° C., to condense any fumaric acid produced. The scraper 23 may be rotated slowly to remove fumaric acid as it condenses on the condenser walls.

As before noted, the scraping elements 3 have the effect not only of scraping distillation residue from the drum surface, but of grinding it to a fine powder. This powder is carried along with the vapor stream and is collected in hopper 25 beneath condenser or trap 22. The glass-wool 28 prevents any of the distillation residue or fumaric acid particles from being carried over into condenser 31.

Condenser 31, by means of a constant boiling bath, may be maintained at a temperature of 70° C. so as to condense out about 94% of the maleic anhydride present in the vapor mixture. The maleic anhydride may be further purified by simple fractional vacuum distillation to produce a product of high purity. The proportion of the maleic anhydride recovered as condensate in condenser 31 may be varied by varying the temperature or pressure of condensation. Thus at 70° C. and 150 mm. pressure about 94% of the maleic anhydride present in the vapors, may be condensed in condenser 31 as a product consisting of about 98% maleic anhydride and 2% maleic acid. By employing a higher condensation temperature substantially pure maleic anhydride, that is anhydride not only free from fumaric acid and other by-products but also free from maleic acid, may be formed, but in this case the proportion of the total maleic anhydride thus recovered will be substantially less. Conversely, lower condensation temperatures will increase the weight yield and the maleic acid content of the maleic anhydride.

From condenser 31 the vapors pass via conduit 34 to a condenser 35 and thence to scrubber 37. Condensate from condenser 35 may be recovered separately from or in admixture with liquid from scrubber 37 and these liquids may be reworked for recovery of their maleic acid which then may be decomposed to maleic anhydride along with fresh maleic acid.

The rotary type of heating vessel described above has been found to be well suited for the handling of maleic acid in dissolved and molten form as well as in solid form. Thus in an eight and three-quarter hour test, an aqueous 60% maleic acid solution was fed continuously to a similar rotary drum heated so that the exit vapors had a temperature between 160° C. and 190° C. The absolute pressure was 150 to 155 mm. of mercury. At the end of the test the drum was substantially clean and free from deposits of decomposition residue.

Instead of subjecting the maleic anhydride-water vapor mixture to treatment for the removal of dust or fumaric acid and dust, one or both of these steps may be omitted and the mixture may be subjected to fractional condensation for recovery of liquid maleic anhydride; in such case the dust and fumaric acid may be separated from the anhydric in subsequent distillation thereof.

I claim:

1. The continuous method of forming a mixture of maleic anhydride vapor and water vapor from maleic acid, which comprises substantially continuously feeding the maleic into an externally heated vessel containing loose, gravitational elements having scraping edges, substantially continuously rotating the vessel to present a fresh hot surface to entering maleic acid and to cause said elements to act upon said surface to scrape deposits therefrom and grind them to dust, and substantially continuously withdrawing from said vessel at a sufficiently rapid rate to maintain the pressure therein below 250 mm. of mercury absolute a mixture of maleic anhydride vapor and water vapor containing said dust suspended therein.

2. The continuous method of forming a mixture of maleic anhydride vapor and water vapor from maleic acid, which comprises substantially continuously feeding the maleic acid at a temperature below its melting point into an externally heated vessel containing loose, gravitational elements having scraping edges, substantially continuously rotating the vessel to present a fresh hot surface to entering maleic acid and to cause said elements to act upon said surface to scrape deposits therefrom and grind them to dust, and substantially continuously withdrawing from said vessel at a sufficiently rapid rate to maintain the pressure therein below 250 mm. of mercury absolute a mixture of maleic anhydride vapor and water vapor containing said dust suspended therein.

3. The continuous method of forming a mixture of maleic anhydride vapor and water vapor from maleic acid, which comprises substantially continuously feeding solid maleic acid into an externally heated vessel containing loose, gravitational elements having scraping edges, substantially continuously rotating the vessel to present a fresh hot surface to entering maleic acid and to cause said elements to act upon said surface to scrape deposits therefrom and grind them to dust, substantially continuously withdrawing from said vessel at a sufficiently rapid rate to maintain the pressure therein below 250 mm. of mercury absolute a mixture of maleic anhydride vapor and water vapor containing said dust suspended therein, and thereafter physically separating the dust from the vapor mixture while maintaining maleic anhydride and water in vapor phase.

4. The continuous method of forming a mixture of maleic anhydride vapor and water vapor from maleic acid, which comprises substantially continuously feeding the maleic acid into an externally heated vessel containing loose, gravitational elements having scraping edges, substantially continuously rotating the vessel to present a fresh hot surface to entering maleic acid and to cause said elements to act upon said surface to scrape deposits therefrom and grind them to dust, substantially continuously withdrawing from said vessel at a sufficiently rapid rate to maintain the pressure therein below 250 mm. of mercury absolute a mixture of maleic anhydride vapor and water vapor containing said dust suspended therein, and coordinating the heating of said vessel and the feeding of maleic acid thereto so as to maintain the mixture of maleic anhydride vapor and water vapor leaving the vessel at a temperature between 160° and 400° C.

JOYCE H. CROWELL.